July 24, 1962  D. D. HARMON  3,045,533
OPTICAL SYSTEM FOR SPECTROGRAPHIC SOURCE
Filed March 19, 1959
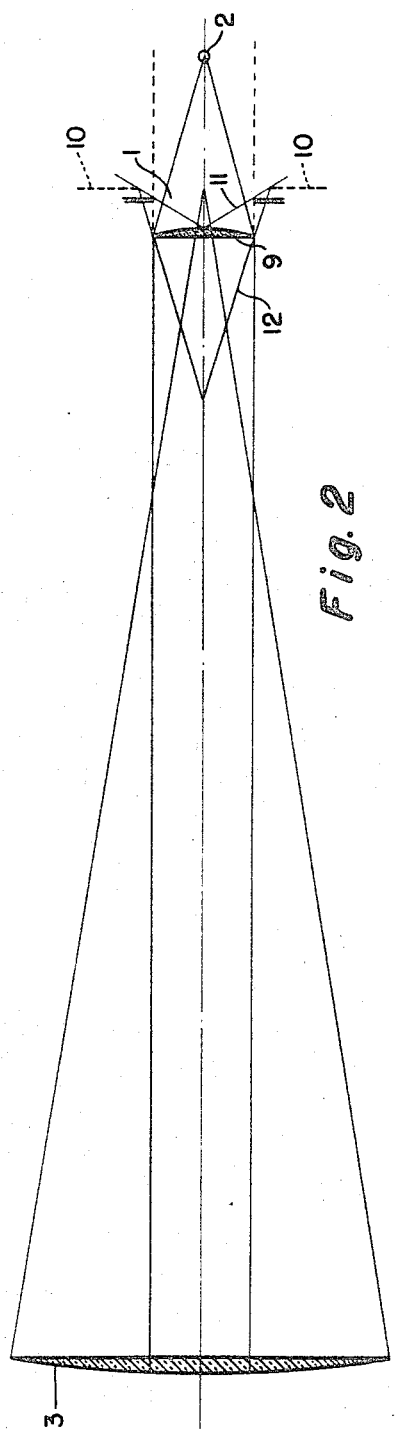
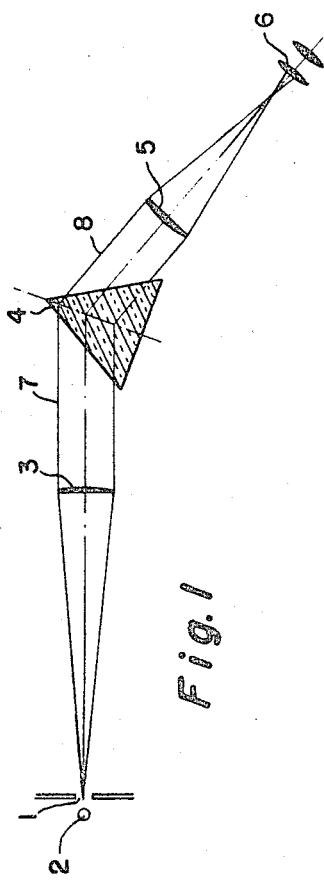
INVENTOR.
Duane D. Harmon
BY Webb, Mackey & Burden
HIS ATTORNEYS

3,045,533
OPTICAL SYSTEM FOR SPECTROGRAPHIC SOURCE

Duane D. Harmon, Sewickley, Pa., assignor to Fisher Scientific Company, Pittsburgh, Pa., a corporation of Pennsylvania
Filed Mar. 19, 1959, Ser. No. 800,516
7 Claims. (Cl. 88—14)

A spectroscope is an instrument for analyzing complex radiations from a light source by prismatic dispersion or by diffraction. To secure as complete separation of the colors as possible, or a "pure" spectrum, a narrow slit must be used as a source so that the colored images of the slit will overlap as little as possible. In analyzing spectographic light sources of very weak intensity, it is necessary to improve the illumination of the slit. This can be accomplished by using external lenses between the source and the slit. Frequently, space limitations preclude the use of external lenses for this purpose; in which event, it is necessary for the source to be brought very close to the slit since illumination from a source varies as the inverse of the square of the distance from the slit. However, when the source moves close to the slit, it then falls within the depth of focus of the collimating lens of the spectroscope. The collimating lens thus projects an inhomogeneous image of the slit and the source. This results in spectral lines of non-uniform intensity along their length when the source is non-uniform. This is undesirable.

I have invented an optical system for a spectroscope which alleviates the above problem and permits the placing of the source in close proximity to the slit when other considerations prevent the use of external lenses. Thus, with my optical system, spectral lines of uniform intensity along their lengths can be obtained from a stigmatic spectroscope when a non-uniform source of light is used in the close proximity of the slit.

My invention is particularly adapted for use with low intensity sources of irregular shape and non-uniform intensity since my invention homogenizes the light from such a source prior to its transmission to the defraction grating or prism in the spectroscope.

I have shown a preferred embodiment of my invention in the following drawings:

FIGURE 1 is a plan view of a conventional spectroscope; and

FIGURE 2 is an enlarged view of an entrance optical train of my improved spectroscope.

Briefly, the present invention consists of an entrance optical train of a spectroscope including a collimating lens and a slit in spaced relationship with an additional lens placed between the collimating lens and the slit in close proximity to the slit. The source is placed on the side of the slit opposite to this additional lens and in close proximity to the slit. The source is at the focal point of the additional lens and thus is imaged at infinity by this lens. The additional lens forms a virtual image of the slit very near the actual slit; the virtual image of the slit is in the focal plane of the collimating lens. Thus, even though the source may fall within the focal depth of the collimating lens, the presence of the additional lens images the source at infinity. This image is well removed from the depth of focus of the collimating lens and therefore will not be imaged at the same point in space by the collimating lens and the succeeding optical train, as is the slit. This results in spectrum lines in which only the image of the slit is brought to a sharp focus while the image of the source is completely defocused.

More specifically, the conventional spectroscope as shown in FIGURE 1, consists of a slit 1, a source 2, a collimating lens 3, a prism 4, a telescope lens 5, and an eye piece 6. The source 2 illuminates the slit 1 through which light is transmitted to the collimating lens 3 which converges the wedge of light from the slit into a parallel beam 7. The parallel beam strikes the prism 4 which disperses the colors. The dispersed colors leave the prism in parallel beams 8, are transmitted to the telescope lens 5 with which real images of the slit are produced at the focus of the eye piece 6.

The above described spectroscope is called a spectrograph when the telescope is replaced by a camera for photographing the spectrum, and a spectrometer when provided with a graduated circle for measuring the angular deviation of the light. A plane diffraction grating may replace the prism of the spectroscope or spectrometer.

When external lenses cannot be used between the slit 1 and a weak source 2 to improve the illumination of the slit, it is necessary that the source be moved very close to the slit. Thus, the source comes within the depth of focus of the collimating lens 3. This results in the transmission of inhomogeneous spectral lines which are images of the slit and of the source.

To alleviate this condition, I have inserted an additional lens 9 between the collimating lens 3 and the slit 1. The source 2 is placed in close proximity of the slit 1 and at precisely the focal point of the additional lens 9. The focal length of the lens 9 must of necessity be quite short so that the source 2 can be very close to the slit 1, thereby providing intense illumination of the slit. Since the source 2 is at the focal point of the additional lens 9, the source will be imaged at infinity by the additional lens 9. The light from the source strikes lens 3 as parallel light and is focused by lenses 3 and 5 at a point well removed from the focal point of the eyepiece 6. The image observed by eyepiece 6 and produced by lenses 9, 3 and 5 is an image only of slit 1 and does not include an image of source 2.

The additional lens 9 will also image the slit 1 as a virtual image 10. The location of this virtual image is found by drawing a line 11 from the center of lens 9 across the top of actual slit opening 1, and a second line 12 from the focal point of lens 9 through the point on the lens intercepted by a ray from the top of the actual slit opening drawn parallel to the optical axis. At the point of crossing of lines 11 and 12, the virtual image 10 will be formed.

In using the known spectroscope, the actual slit 1 is located in the focal plane of the collimating lens 3; however, in using my improved spectroscope, the virtual image 10 is located in the focal plane of the collimating lens 3.

As the size of the virtual image of the slit increases, the light intensity per unit area of the virtual image of the slit decreases. Thus the virtual image must be as small as possible; i.e., as close to the actual slit as possible. One factor which causes the virtual image of the slit to increase tremendously in size is moving the lens 9 away from the slit 1 and toward the collimating lens 3. Therefore, the additional lens 9 must be as close to the slit as possible. However, this desideratum must be balanced against the necessity of having the source 2 as close to the slit as possible since the source 2 must be located at the focal point of the lens 9. Another factor which will cause the size of the virtual image of the slit to increase is to decrease the focal length of the additional lens 9. However, the focal length of the additional lens must be short to permit the source to be close to the slit. All of these factors must be balanced in the use of my invention; however, normally it will be found that the focal length of lens 9 should be very short, the lens 9 should be very close to the slit 1 and thereby, the virtual image of the slit will be located relatively close to the actual slit 1. A final consideration in determining how close the additional lens 9 should be to the slit depends upon the resolving power desired in the spectroscope.

The additional lens 9 does not affect the intensity of the illumination of the slit other than slightly increasing the size of the virtual image of the slit upon which the collimating lens is focused. This minor increase does not as a practical matter affect the illumination of the slit as seen by the collimating lens. However, the additional lens 9 homogenizes the light from the slit, thereby eliminating the undesirable effects of a source of irregular shape and non-uniform intensity.

My invention can be used with all sources, whether of weak intensity or strong intensity, whether homogeneous or inhomogeneous; however, my invention is particularly adapted for use when the source being analyzed is of non-uniform intensity and so weak that it must be placed very close to the slit. An object which lies near the point of focus of a lens but removed from the point a distance S is not completely defocused when the out-of-focus circle of least confusion subtends an angle of a certain size at the center of the lens. The out-of-focus circle of least confusion is a disk, at the point of focus of the lens, through which all rays originating at a point on the object must pass in order to enter the lens. The distance S can be determined for any collimating lens from the following equation:

$$S = \frac{f \times f \text{ ratio}}{\left[\frac{1000}{X}\right] - f \text{ ratio}}$$

wherein:

S is the distance from the source to the focal plane of the collimating lens;

$f$ is the focal length of the collimating lens;

$f$ ratio is the focal length of the collimating lens divided by the effective diameter of the collimating lens wherein the effective diameter is defined as the diameter of the area on the collimating lens through which all of the radiant flux passes that produces an image on the focal plane of the objective lens in the spectroscope;

X is the angle (measured in mils) subtended at the center of the collimating lens (in the absence of the additional lens) by a first circle of least confusion (derived from a first point of the source) at the point of focus on the collimating lens which the receiving medium will resolve from a similar circle of least confusion immediately adjacent to the first circle, said similar circle derived from a second point on the source having a different intensity from the first point.

The above equation defines, in essence, the sources which require my invention for analysis. For example, if the source being analyzed is of such weak, non-uniform intensity that it must be placed within the distance S (due either to space limitation or other reasons), then my invention is necessary for analysis of this source if the X value is within the limits stated below. The $f$, $f$ ratio and X values are known for my spectroscope and thus the distance S can be easily calculated.

Also see the publication "Concept of Classical Optics" by Strong, published by W. H. Freeman & Co. in 1958 for a further explanation of the above equation.

This equation defines the values of X and S within which difficulties exist in using weak, non-uniform intensity sources with spectroscopes not having the additional lens of my spectroscope, which can be obviated with my invention. My invention, although possibly not needed, will operate over any limits of X and S, however large. I have found, however, that my invention is absolutely necessary if a weak, non-uniform source is placed within the distance S, and X is 20 mils or less; is probably needed if the same conditions prevail but X is between 20 and 40 mils; is probably not needed when the same conditions exist but X is between 40 and 80 mils (but the need for my invention in this range is determined by the uniformity of the source—as the source becomes more uniform, the need for my invention lessens); and is not needed when the same conditions prevail but X is greater than 80 mils.

By the term "non-uniform intensity source" herein, I mean a source having at least two points of different intensity.

By the term "weak intensity source" herein, I mean a source which normally must be intensified for proper illumination of the slit (when using a spectroscope not having the additional lens of my invention) to obtain spectral lines of sufficient intensity to be detectable at the receiving medium. In photographic recording, such as a spectrograph, the spectral lines at the receiving medium also must be uniform along their lengths for quantitative analysis work.

A useable intensity of the weak source is one which is sufficient to effect visibility of the Calcium 4026 Angstroms line when calcium is present in a quantity of one microgram per milliliter in the sample being analyzed.

*Example*

Spectral lines of uniform intensity along their length were obtained from a weak, non-uniform intensity source by utilizing my new spectroscope having the following dimensions: Distance from source to slit 9.5 mm., distance from additional lens to slit 1.7 mm., focal length of additional lens 11.2 mm., effective diameter of collimating lens 25 mm., focal length of collimating lens 122 mm., sum of the distances of the source to the slit and the slit to the lens 11.2 mm., and size of the slit 0.037 mm. wide and 6 mm. high.

In utilizing the above formula to determine if my invention was necessary in analyzing this source, I found that:

$$f \text{ ratio} = \frac{122}{25} = 4.88$$

$$X = 20 \text{ mils}$$

$$S = \frac{122 \times 4.88}{\frac{1000}{20} - 4.88} = 13.2 \text{ mm.}$$

Since the distance from the source to the slit was less than 13.2 mm., my invention was necessary in analyzing this source to obtain spectral lines of uniform intensity along their lengths.

While I have described a present preferred embodiment of my invention, it may be otherwise embodied within the scope of the following claims.

I claim:

1. In a spectroscope for analyzing a spectrographic light source, an illumination system comprising: a slit; a collimating lens spaced from the slit and illuminated by light passing through the slit; and an additional lens positioned between the collimating lens and the slit; said source being positioned on the side of the slit opposite to and at about the principal focal point of said additional lens; a virtual image of said slit being formed by the additional lens; and the focal point of the collimating lens being located at about the plane of said virtual image.

2. In a spectroscope as recited in claim 1 wherein the light source is of weak intensity and must be placed very close to the slit thereby preventing the use of an external lens to improve the illumination of the slit; said source being located less than a distance S from the slit, and $$S = \frac{f \times f \text{ ratio}}{\frac{1000}{X} - f \text{ ratio}}$$

wherein $f$ is the focal length of the collimating lens; $f$ ratio is the focal length of the collimating lens divided by the effective diameter of the collimating lens wherein the effective diameter is the diameter of the area on the collimating lens through which all of the radiant flux passes that produces an image on the focal plane of an objective lens positioned in the spectroscope beyond the collimating lens; X is the angle (measured in mils) subtended at the center of the collimating lens by a first circle of least confusion (derived from a first point on the source) at the point of focus of the collimating lens which a receiving medium of the spectroscope will resolve from a similar circle of least confusion adjacent to the first circle, said similar circle derived from a second point on the source having a different intensity from the first point.

3. In a spectroscope as recited in claim 2 wherein X is less than 80 mils.

4. In a spectroscope as recited in claim 2 wherein X is less than 40 mils.

5. In a spectroscope as recited in claim 2 wherein X is less than 20 mils.

6. In a spectroscope as recited in claim 1, wherein said additional lens has a short focal length.

7. In a spectroscope having a slit and a collimating lens for use in analyzing spectrographic light sources of weak and non-uniform intensity such that the sources normally must be placed near the slit and within the depth of focus of the collimating lens and the use of external lenses to improve the illumination of the slit is prevented; such sources normally forming non-uniform spectral lines; an entrance train of the spectroscope comprising: said slit, said collimating lens, a second lens positioned between the slit and collimating lens, the lenses being illuminated by light passing through the slit; the source being positioned at about the principal focal point of the second lens and on the opposite side of the slit from the second lens; the source being imaged at infinity and a virtual image of the slit being formed by the second lens; said virtual image being located at the focal point of the collimating lens; the second lens being located sufficiently close to the slit to maintain the desired resolving power in the spectroscope and having a focal length such that the source may be positioned at the focal point of the second lens and also be sufficiently near the slit to adequately illuminate the slit.

References Cited in the file of this patent
UNITED STATES PATENTS

| | | |
|---|---|---|
| 1,727,173 | Muller | Sept. 3, 1929 |

FOREIGN PATENTS

| | | |
|---|---|---|
| 329,737 | France | May 9, 1903 |
| 255,788 | Germany | Jan. 22, 1913 |